F. A. GRIESSMANN.
AUTOMATIC BALANCING DEVICE FOR CENTRIFUGAL PUMPS AND THE LIKE.
APPLICATION FILED APR. 23, 1908.
898,462.  Patented Sept. 15, 1908.
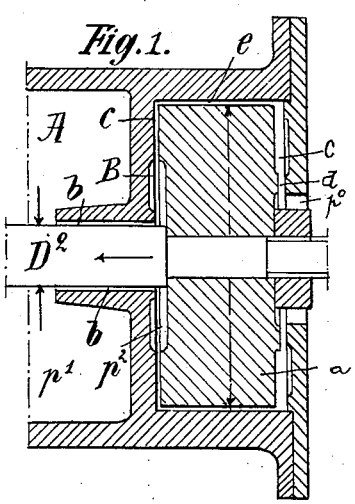
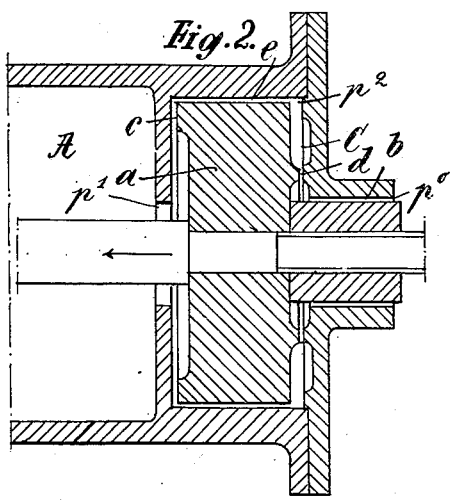
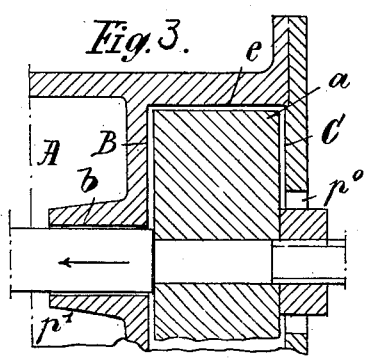
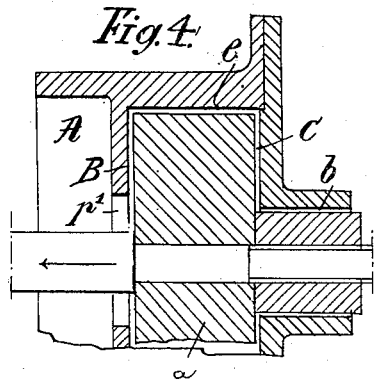
WITNESSES
INVENTOR

UNITED STATES PATENT OFFICE.

FRANZ ARNO GRIESSMANN, OF BERLIN, GERMANY.

AUTOMATIC BALANCING DEVICE FOR CENTRIFUGAL PUMPS AND THE LIKE.

No. 898,462.     Specification of Letters Patent.     Patented Sept. 15, 1908.

Application filed April 23, 1908. Serial No. 428,770.

*To all whom it may concern:*

Be it known that I, FRANZ ARNO GRIESSMANN, subject of Germany, residing at Berlin, Germany, have invented new and useful Improvements in Automatic Balancing Devices for Centrifugal Pumps and the Like, of which the following is a specification.

My invention relates to improvements in automatic balancing devices for high pressure centrifugal pumps, steam turbines, and the like.

In the accompanying drawing Figure 1 is a longitudinal section through one form of construction of my new balancing device. Figs. 2, 3 and 4 are like views of modifications.

In machinery of the class mentioned it has been the practice to overcome the endlong thrust or axial pressure of the shaft by means of balancing-pistons, which run with but slight play in a suitably constructed part of the casing. Such a piston exerts a constant push on the shaft. Since, however, the endlong thrust in a steam turbine, centrifugal pump, and the like, can only be approximately calculated beforehand, and since the thrust, owing to internal wear and tear in the machine, alters during working, it is desirable to overcome such thrust in some manner which permits of balancing of the forces within certain limits. The resistance, therefore, must be greater or smaller, as there is greater or less endlong thrust of the machine.

According to my invention I attain this by mounting on the shaft whose endlong thrust is to be balanced, a rotating member within a chamber closed with the aid of narrow throttling fissures, in such manner that on shifting of the shaft, owing to the changing endlong thrust, it causes increased resistance to the flow of the pressure agent and thus a pressure directed counter to the shifting motion of the shaft and corresponding thereto.

Four different forms of constructions of the invention are illustrated in the drawing.

The piston $a$, runs with the usual slight radial play of from 0.1 to 0.2 mm. in a suitably shaped part of the stationary casing. To the faces of the piston there are presented two fixed walls, between which the piston has so much axial clearance as the members in the interior of the machine, such as the wheels of a centrifugal pump, demand, if wear and tear of these members by friction against each other is to be avoided. In the case of a centrifugal pump this clearance would, as experience shows, be about 4 to 6 mm., so that when the piston is in its middle position there would be an axial distance of from 2 to 3 mm. between it and each fixed wall. In Figs. 1 and 2 the extent of endlong thrust possible is limited on the pressure side by outwardly located facings and on the free side by inwardly located facings; while in the constructions shown in Figs. 3 and 4, on shifting occurring to the right or to the left the entire face of the piston bears against the respective fixed wall. In front or behind the balancing-piston, $a$, throttling-fissures, $b$, are provided, formed by the shaft, or a collar on it, running with the small play of 0.1 to 0.2 mm. in a corresponding fixed bearing part.

Referring more particularly to Fig. 1, the manner of working is as follows. When the piston, $a$, is in its central position there prevails in the chamber, A, a pressure, $p^1$, and in the space, B, in front of the piston, $a$, a pressure, $p^2$, which is less owing to the fall of pressure in the fissure, $b$; in the space, C, behind the piston, $a$, there prevails the outside pressure, $p^0$, since with the facings at the mean distance of from 2 to 3 mm. at, $d$, there will be no accumulation of pressure in the space, C, and the normal endlong thrust produced by the pump is balanced in the central position of the piston. Should, now, for any of the reasons mentioned, the endlong thrust of the machine acting in the direction of the arrow increase, there will result a motion of the shaft and thus of the piston toward the left. The facings, $c$, thus approach each other, and as they offer increased resistance to the working agent flowing through, they cause accumulation of pressure in the space, B. Since $p^2$ increases, therefore, the total pressure exercised on the piston, $a$, is increased and the endlong thrust of the machine is balanced again. Should the endlong thrust acting in the direction of the arrow diminish, the shaft will be shifted to the right by the piston and there will be a resistance to flow at, $d$, in the same manner as there was such before at, $c$. In this manner there will be an increase of pressure caused in the space, C, so that the piston, $a$, by reason of the counter-pressure on its right-hand face will now only be able to balance a smaller total pressure than when it was in the central position. The endlong thrusts produced by the piston and the machine are thus also again equal.

The manner of working of the automatic balancing-piston shown in Fig. 3, which has no facings, differs from the above-described only in as much as the pressures occuring in the spaces, B, and, C, after motion of the piston, a, are not constant over the entire area of the piston, but alter according to some law, viz. decrease from within outward, or vice versa.

The mode of operation of the construction shown in Fig. 2, with a throttling fissure located rearward of the piston, is as follows. During normal endlong thrust of the machine, that is, when the piston is in its central position, there exists on the face of the piston, $a$, turned toward the pressure chamber, A, a pressure, $p^1$, which in consequence of the limited play at, $e$, in the space, C, falls to $p^2 < p^1$, and, owing to the fissure, $b$, is finally reduced to the outside pressure, $p^0$. If the pressure of the machine acting in the direction of the arrow increases, there results a motion of the shaft toward the left and the fissure at, $c$, being reduced offers resistance to the agent flowing through, so that the counter-pressure on the piston, $a$, which is conditioned by the tension in the space, C, becomes lower. The decrease of pressure on the right hand face of the piston must be such that the piston again balances the increased endlong thrust of the machine. Should the endlong thrust decrease, the shaft will shift toward the right. Through approach of the facings at, $d$, resistance will be offered to the flow of the agent, so that the pressure, $p^2$, in the space, C, and thus the total pressure exercised on the piston, $a$, toward the left, increases by the amount by which the endlong thrust of the machine has become less.

The form of construction without facings shown in Fig. 4 operates exactly the same as that illustrated in Fig. 2, with the sole difference that on motion of the piston toward the right or the left, the specific pressures on the faces of the piston are not constant, but decrease according to a definite law.

Having thus described my invention, what I claim as new and desire to secure by Letters Patent is:—

1. An automatic balancing device, comprising a shaft, a piston mounted thereon, a main pressure chamber, and a chamber in which the piston works, with but throttling-clearance at the periphery and fissures at the faces adapted to throttle the pressure agent on axial shifting of the shaft in either direction, said piston-chamber communicating on the one side with the main pressure chamber and on the other side with the atmosphere, the one of said passages presenting a throttling-fissure concentric with the shaft, substantially as described.

2. An automatic balancing device, comprising a shaft, a piston mounted thereon, a main pressure chamber, and a chamber in which the piston works with but throttling-clearance at the periphery and fissures at the faces adapted to throttle the pressure agent on axial shifting of the shaft in either direction, said piston chamber communicating on the one side with the main pressure chamber by means of a throttling-fissure concentric with the shaft and on the other side with the atmosphere, substantially as described.

3. An automatic balancing device, comprising a shaft, a piston mounted thereon, a main pressure chamber, and a chamber in which the piston works with fissures at the faces, adapted to throttle the pressure agent on axial shifting of the shaft in either direction, said piston chamber communicating on the one side with the main pressure chamber and on the other side with the atmosphere, the one of said passages presenting a throttling-fissure concentric with the shaft, substantially as described.

In testimony whereof I have signed my name to this specification in the presence of two subscribing witnesses.

FRANZ ARNO GRIESSMANN.

Witnesses:
 HENRY HASPER,
 HANS HEIMANN.